United States Patent
Foerg et al.

(10) Patent No.: US 9,120,945 B2
(45) Date of Patent: Sep. 1, 2015

(54) METHOD FOR THE PRODUCTION OF A DISPERSION

(71) Applicant: Hilti Aktiengesellschaft, Schaan (LI)

(72) Inventors: Christian Foerg, Lamerdingen (DE); Sebastian Simon, Buchloe Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 185 days.

(21) Appl. No.: 13/787,077

(22) Filed: Mar. 6, 2013

(65) Prior Publication Data

US 2013/0237662 A1 Sep. 12, 2013

(30) Foreign Application Priority Data

Mar. 7, 2012 (DE) .......................... 10 2012 203 555

(51) Int. Cl.

| C09K 21/00 | (2006.01) |
|---|---|
| C09D 133/06 | (2006.01) |
| C09D 5/02 | (2006.01) |
| C09D 5/34 | (2006.01) |
| C09D 7/00 | (2006.01) |
| C09D 7/14 | (2006.01) |

(52) U.S. Cl.
CPC .............. *C09D 133/06* (2013.01); *C09D 5/027* (2013.01); *C09D 5/34* (2013.01); *C09D 7/002* (2013.01); *C09D 7/14* (2013.01)

(58) Field of Classification Search
CPC .................................................... C09D 133/06
USPC ......... 252/70, 73, 610; 516/70, 112; 524/562, 524/563
See application file for complete search history.

(56) References Cited

U.S. PATENT DOCUMENTS

| 4,904,411 | A | 2/1990 | Novich et al. |
|---|---|---|---|
| 5,322,576 | A | 6/1994 | Aitken et al. |
| 6,531,538 | B1 | 3/2003 | Weitzel et al. |
| 6,828,382 | B1 | 12/2004 | Loth et al. |
| 2005/0107520 | A1 | 5/2005 | Gottschalk-Gaudig et al. |
| 2010/0032089 | A1 | 2/2010 | Soies et al. |
| 2011/0034602 | A1 | 2/2011 | Tobler |
| 2011/0039995 | A1 | 2/2011 | Lohmeijer et al. |

FOREIGN PATENT DOCUMENTS

| DE | 3433720 | 7/1994 |
|---|---|---|
| DE | 19850214 | 5/1999 |
| DE | 19964153 | 9/2000 |
| DE | 10349082 | 5/2005 |
| EP | 1557455 | 7/2008 |
| EP | 2 151 484 | 2/2010 |
| GB | 1 217 446 | 12/1970 |
| WO | WO 2009/130238 | 10/2009 |

*Primary Examiner* — Khanh Tuan Nguyen
(74) *Attorney, Agent, or Firm* — Davidson, Davidson & Kappel, LLC

(57) ABSTRACT

A method is described for the production of a dispersion, especially a coating or sealing compound, having a viscosity of less than about 30,000 mPas, whose viscosity increases to more than 50,000 mPas or that becomes firm as a result of its application, whereby a shear-thickening additive is added to a precursor composition of the dispersion at a shear rate that does not activate the shear-thickening additive. Consequently, it is possible to formulate dispersions, especially sealing and/or coating compounds, in such a way that they have a low viscosity for storage and processing, and only at the time of the use of the dispersion is the final viscosity set by suitable equipment.

14 Claims, 1 Drawing Sheet

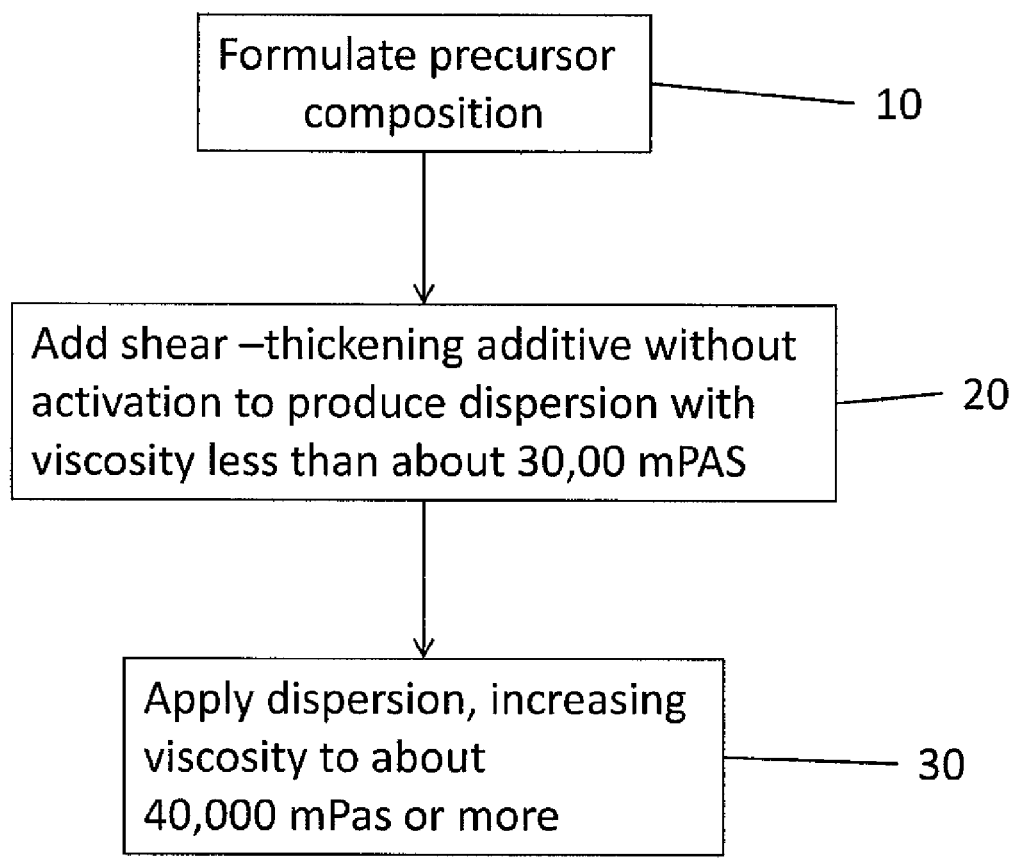

METHOD FOR THE PRODUCTION OF A DISPERSION

This claims the benefit of German Patent Application DE 10 2012 203 555.9, filed Mar. 7, 2012 and hereby incorporated by reference herein.

The present invention relates to a method for the production of a dispersion, especially a low-viscosity dispersion for water-based coatings or sealing compounds, that is only converted into a dispersion having a high viscosity or into a firm dispersion at the time of application.

BACKGROUND

Coating and sealing compounds are widespread nowadays and are used extensively in a wide range of sectors, for instance, for structural fire protection, for sealing joints, as adhesives and the like. One feature of these compounds is their high viscosity since they are no longer supposed to flow after they have been applied. They should be firm immediately after being applied so as to permit the simplest possible processing. Normally, the processing and application viscosity of the coating compounds or sealing compounds is already set before they are processed.

SUMMARY OF THE INVENTION

High-viscosity, especially firm compounds whose viscosity is already set to the process and application viscosity are disadvantageous since their processing usually requires high dispensing forces or appropriate, usually expensive, equipment.

Another disadvantage of these systems arises during the processing of the compounds at low temperatures, especially below 10° C., since the already high viscosity set, as is required for processing at normal temperatures (approximately 20° C. to 25° C.), usually increases even further. As a result, devices such as, for example, small airless spray devices, reach their limits due to the increase in viscosity of the compounds to be processed and due to the more difficult suction conditions. If the compounds are set for processing at low temperatures, they usually need to have a low viscosity. The drawback of this, however, is that these systems do not exhibit sufficient firmness when used in the normal temperature range.

Multi-component systems that can be thickened shortly before being processed have the drawback of entailing an additional work step. Moreover, these systems are error-prone, for instance, due to improper metering of the components (incorrectly selected mixing ratio), due to stirring for a time that is too long or too short, as well as due to the entrainment of impurities from dirty mixing devices.

Therefore, there is a need for a method with which it is possible to produce familiar compositions, especially coating or sealing compositions, that, already before the application procedure, have a sufficiently low viscosity to allow simpler handling, especially simpler processing (application), but that are converted into a high-viscosity to firm compound by means of the processing such as conveying, pumping or spraying.

The present invention provides a method for the production of a dispersion having a viscosity of less than about 30,000 mPas, whose viscosity increases to more than 50,000 mPas or that becomes firm as a result of its application, whereby a shear-thickening additive is added to a precursor composition of the dispersion at a shear rate that does not activate the shear-thickening additive.

BRIEF DESCRIPTION OF THE DRAWING

FIG. 1 shows a flowchart of the method of the present invention.

DETAILED DESCRIPTION

As used herein, the term "high-viscosity compound" refers to a compound having a viscosity between 38,000 and 65,000 mPas, measured according to DIN EN ISO 2555 using a Brookfield rotational viscometer at 23 degrees Celsius. The term "compound" is to be understood as a generic expression for "coating compound" and "sealing compound", and aside from the above-mentioned compounds, also includes other compounds whose use calls for a high viscosity or firmness such as, for instance, adhesive compounds. "Firm" refers to a compound with a viscosity above 40,000 mPas, likewise measured according to DIN EN ISO 2555 using a Brookfield rotational viscometer at a temperature of +23 degrees Celsius.

The invention was based on the idea of formulating a ready-to-use compound that is set to a storage and processing viscosity, that is to say, that has a low viscosity, so that it can be easily processed by means of conventional equipment. Only when the compound is applied, in other words, after it has been sprayed on or pumped, should the required or desired high viscosity be established.

The inventors have found that, by using specific rheological additives, it becomes possible to set the viscosity of the compound to the desired values by selecting different shear rates during the mixing of the dispersion, during the production and during the processing. Unlike the usual applications, however, the rheological additive is not activated during the mixing or dispersing process but rather, at first, it remains passive (not activated) in the mixture. Only through the processing procedure, the spraying or the conveying of the dispersion is the rheological additive activated due to the shearing that occurs at the nozzle or at the filters, thereby changing the dispersion to the final viscosity that the dispersion requires for its actual application.

The present invention thus provides a process for the production of a dispersion, especially a sealing or coating compound, having a viscosity of less than about 30,000 mPas (Brookfield spindle 6 at 10 rpm at a temperature of +23 degrees Celsius), whose viscosity increases to more than 38,000 mPas (Brookfield spindle 6 at 10 rpm at a temperature of +23 degrees Celsius) as a result of its application, as a result of which it becomes firm, whereby a shear-thickening additive is added to a precursor composition of the dispersion, especially the sealing or coating compound, at a shear rate that does not activate the shear-thickening additive.

The term "precursor composition" refers to a composition that contains all of the components of the dispersion except for the shear-thickening additive and, if applicable, (additional) thickening agents, for example, a binder system such as an acrylate dispersion, solvents such as water, additives such as pigments, pigment distributors, agents for setting the pH value of the dispersion, frost-protection agents and the like, as well as fillers such as fire-protection additives and the like. Step 10 of FIG. 1 show formulation of the precursor composition.

Preferably, the shear-thickening additive is added in step 20 to the precursor composition in a quantity of 1.0% to 3.5% by weight, relative to the dispersion. Higher percentages of thickening agents are not cost-effective.

The limits within which the shear rate for the addition of the shear-thickening additive can fall without its being activated and bringing about its viscosity-increasing effect depend on the additive used and on the agitation conditions.

Advantageously, the shear rate for the admixture of the shear-thickening additive can be in the range from 100 to 1000 s$^{-1}$, preferably from 500 to 1000 s$^{-1}$, for instance, using a turbine agitator or a butterfly mixer. At high shear rates, the risk exists that the material will already be activated during storage or transport. This can occur when an admixing device is used during the filling of the dispersion. As an alternative, the shear-thickening additive can be metered in a static mixer during the filling process.

Preferably, the shear-thickening additive is added immediately after the production of the precursor composition and, if applicable, after the addition of a non-shear-thickening agent, whereby the stirring time is limited to the homogeneous distribution of the thickening agent. Generally speaking, a homogenization level of 90% is already sufficient. As an alternative, the shear-thickening additive can be admixed while the dispersion is being filled or transferred into the storage containers, for example, by an admixing device or a static mixer.

Constant agitation of the dispersion during and after the addition of the shear-thickening additive preferably should be avoided since shear forces already occur at the edges of the mixing equipment at low rotational speeds, and said forces partially activate the shear-thickening additive. Therefore, the longer the agitation time after the addition of the shear-thickening additive, the higher the pre-set viscosity and, in the worst case scenario, it exceeds the desired processing and storage viscosity of the dispersion.

A suitable shear-thickening additive for example is an aqueous system of a copolymer on the basis of acrylic acid, acrylamide or at least an acrylic acid ester containing carboxyl groups, preferably emulsified in an oil fraction, especially a crude oil fraction. The solids content of the aqueous system or of the emulsion is between 20% and 40%, preferably between 24% and 28%, according to DIN 33189 (or ISO 1625). However, it is also possible to use other shear-thickening systems, preferably water-based ones, as the rheological additive. Examples of shear-thickening additives include Collacral® HP, Collacral® admixing device DS, or Latekoll® LS 6269 (all made by BASF).

For purposes of better handling of the ready-to-use dispersion, the viscosity of the precursor composition is preferably set to 3,000 to 32,000 mPas before the shear-thickening additive is added. For this purpose, a thickening agent can be added in an amount that is sufficient to set the viscosity of the dispersion to the above-mentioned value. Suitable thickening agents are, for example, water-soluble viscosity-promoting resins that bring about viscosity and that can be used in minimal quantities to impart the dispersion with the desired viscosity. However, other thickening agents that are known to the person skilled in the art can also be used.

The dispersion can also contain other additives such as anti-settling agents, emulsifiers, plasticizers, buffers, auxiliaries (e.g. pigment distributors), frost-protection agents, pigments, organic and/or inorganic fillers (e.g. chalk).

If applicable, the dispersion can be homogenized before being filled or applied. Here, care should be taken to ensure that the viscosity is not increased significantly by the homogenization. Accordingly, the homogenization is carried out at a shear rate at which the shear-thickening additive is not activated. If the shearing is too strong, the shear-thickening additive is activated and the viscosity rises to the envisaged final viscosity, as a result of which the processing can no longer be done on conventional equipment.

Corresponding to the shear rate for mixing in the shear-thickening additive, the homogenization is preferably carried out at a shear rate of 100 to 1000 s$^{-1}$.

After formulation of the dispersion, especially of the sealing or coating compound, it can be filled into a storage container, whereby the shear rate is kept so low that the shear-thickening additive is not activated.

Only when the dispersion is applied, as shown in step 30 of FIG. 1, is the shear-thickening additive activated, so that the desired final viscosity, especially firmness, is achieved after the application. This can be achieved through sufficient shearing of the system during the application. The shearing can be carried out, for example, using pumps with which the dispersion is conveyed from a storage container to the place where it is to be applied. Suitable pumps are, for example, eccentric screw pumps, diaphragm pumps or piston pumps. Moreover, spray devices such as a metering pump with shearing elements or an extension tube with an internal shearing element or mixer can bring about sufficient shearing. If the shearing through the nozzle or the filters is not sufficient to bring about the activation, then additional mixing elements such as a static mixer can be employed.

During the application, the shear rate can be appropriately ≥10,000 s$^{-1}$, so that the shear-thickening additive is activated, whereby the viscosity of the dispersion, especially of the sealing or coating compound, increases to the desired value.

The method according to the invention makes it possible to formulate dispersions, especially sealing and/or coating compounds, in such a way that they have a low viscosity for storage and processing. Only at the time of the use of the dispersion is the final viscosity established by means of suitable equipment.

This makes it possible to reduce the suction nozzle diameters usually needed for high-viscosity, especially firm compounds. The spray systems that often can no longer be used at low temperatures can now be used, even at low temperatures, thanks to the small suction and conveying power required. Moreover, it is possible to considerably improve the residual emptying of packs in which it is important for the compound that is to be processed to flow together at the lowest point, or to the site of the suction nozzles. Accordingly, simpler and thus less expensive processing equipment and pumps can be used.

The invention is explained in greater detail on the basis of the following embodiments:

EMBODIMENTS

The dynamic viscosity was determined in accordance with DIN EN ISO 2555 using a Brookfield rotational viscometer, type RV-DVE, with a spindle 6 at 10 rpm and at a temperature of +23° C. for 60 seconds.

Example 1

A water-based elastic coating having the formulation from Table 1 is set to a storage and processing viscosity of 15,000 mPas by means of a thickening system (Thixol® 53L (Coatex Inc.)). Subsequently, 2% m/m Collacral® HP (BASF) is incorporated under agitation at about 100 revolutions per second, yielding a compound having a viscosity of 32,000 mPas. The mixture is agitated only until a homogeneous dispersion is obtained.

TABLE 1

Composition - Dispersion Example 1

| Component | Percentage by weight |
|---|---|
| Aqueous 50%-dispersion of acrylate (styrene acrylate dispersion, Acronal ® NS 567 (50%), BASF) | 40 |
| Water | 15 |
| Chalk (Omyacarb 5-GU, Bassermann Minerals GmbH) | 30 |
| Pigment distributor (pigment distributor A, BASF) | 3 |
| Diisononylphthalate | 3 |
| Ammonia or ammonia phosphate (pH setting) | 2 |
| Monoethylene glycol | 2 |
| Titanium dioxide (Kronos ® 2300, KRONOS Worldwide, Inc. | 5 |

This compound is processed with a pressure-building system and conveyed through a filter and a spray nozzle (Wagner SF31 diaphragm pump; spray tip 425). This results in a firm compound that has a viscosity of 54,000 mPas.

Example 2

The components for a water-based elastic coating having the formulation from Table 2 are mixed, whereby a dispersion having a viscosity of 12,000 mPas is obtained. Subsequently, 2% m/m Collacral® HP (BASF) is incorporated under agitation at about 100 revolutions per second, yielding a compound having a viscosity of 32,000 mPas. The mixture is agitated only until a homogeneous dispersion is obtained.

TABLE 2

Composition - Dispersion Example 2

| Component | Percentage by weight |
|---|---|
| Aqueous 50%-dispersion of acrylate (ethylene-vinyl acetate emulsion, DUR-O-SET ® Elite 22LV, Celanese Emulsions) | 20 |
| Water | 10 |
| Chalk (Omyacarb 5-GU, Bassermann Minerals GmbH) | 60.5 |
| Pigment distributor (pigment distributor A, BASF) | 1 |
| Ammonia or ammonia phosphate (pH setting) | 1 |
| Monoethylene glycol | 2.5 |
| Titanium dioxide (Kronos ® 2300, KRONOS Worldwide, Inc. | 5 |

This compound is processed with a pressure-building system and conveyed through a filter and a spray nozzle (Graco Ultramay 695 piston pump; spray tip 517). This results in a firm compound that has a viscosity of 54,000 mPas. This compound could just still be drawn in from a bucket without the need, for example, for pressure transfer plates.

It was possible to show that a shear-thickening additive can be incorporated into a dispersion without activating the additive, so that a dispersion is obtained that has a viscosity at which the dispersion can be easily processed. After the processing by means of equipment that shears the dispersion, a firm compound was obtained in each case.

What is claimed is:

1. A method for the production of a dispersion having a viscosity of less than about 30,000 mPas, whose viscosity increases to more than about 40,000 mPas as a result of its application, comprising:
   adding a shear-thickening additive to a precursor composition of the dispersion at a shear rate that does not activate the shear-thickening additive.

2. The method as recited in claim 1 wherein the shear-thickening additive is added to a precursor composition in an amount of 1.5% to 3.5% by weight, relative to the dispersion.

3. The method as recited in claim 1 wherein the shear-thickening additive is added at a shear rate in the range from 100 to 1000 $s^{-1}$.

4. The method as recited in claim 1 wherein the shear-thickening additive is an aqueous system of a copolymer on the basis of acrylic acid, acrylamide or at least an acrylic acid ester containing carboxyl groups.

5. The method as recited in claim 4 wherein the aqueous system of a copolymer is emulsified in an oil fraction.

6. The method as recited in claim 4 wherein the solids content of the aqueous system or of the emulsion is between 20% and 40% according to DIN 33189.

7. The method as recited in claim 1 wherein the viscosity of the precursor composition is set to 3,000 to 30,000 mPas before the shear-thickening additive is added.

8. The method as recited in claim 1 further comprising, after the addition of the shear-thickening additive, homogenizing the dispersion at a shear rate at which the shear-thickening additive is not activated.

9. The method as recited in claim 8 wherein the homogenization is carried out at a shear rate of 100 to 1000 $s^{-1}$.

10. The method as recited in claim 1 further comprising filling the dispersion into a storage container at a shear rate at which the shear-thickening additive is not activated.

11. The method as recited in claim 1 wherein the viscosity increases to more than 40,000 mPas as a result of the application.

12. The method as recited in claim 11 wherein the viscosity increases to more than 50,000 mPa as a result of the application.

13. A dispersion, having a viscosity less than about 30,000 mPas, the viscosity increasing to more than about 40,000 mPas as a result of its application, produced by the method recited in claim 1.

14. A method for applying the dispersion as recited in claim 1 comprising applying the dispersion to activate the shear-thickening additive, the viscosity increasing to more than about 40,000 mPas as a result of the applying.

* * * * *